United States Patent
Mankour et al.

(10) Patent No.: US 12,391,887 B2
(45) Date of Patent: Aug. 19, 2025

(54) POLYMER-METAL SALT COMPOSITE FOR THE DEHYDRATION OF WATER FROM SWEET GAS AND LIQUID CONDENSATE STREAMS

(71) Applicants: SAUDI ARABIAN OIL COMPANY, Dhahran (SA); KING FAHD UNIVERSITY OF PETROLEUM & MINERALS, Dhahran (SA)

(72) Inventors: Youcef Mankour, Dhahran (SA); Othman Charles Sadeq Al Hamouz, Dhahran (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 18/673,711

(22) Filed: May 24, 2024

(65) Prior Publication Data

US 2024/0309277 A1    Sep. 19, 2024

Related U.S. Application Data

(62) Division of application No. 17/661,171, filed on Apr. 28, 2022, now Pat. No. 12,054,678.

(51) Int. Cl.
| | | |
|---|---|---|
| C10G 33/04 | (2006.01) | |
| B01D 15/00 | (2006.01) | |
| B01D 15/20 | (2006.01) | |
| B01J 20/20 | (2006.01) | |
| B01J 20/24 | (2006.01) | |
| B01J 20/30 | (2006.01) | |
| C08B 37/00 | (2006.01) | |
| C10G 25/00 | (2006.01) | |

(52) U.S. Cl.
CPC .......... *C10G 33/04* (2013.01); *B01D 15/203* (2013.01); *B01J 20/24* (2013.01); *B01J 20/3007* (2013.01); *C08B 37/0096* (2013.01); *C10G 25/003* (2013.01); *C10G 2300/201* (2013.01)

(58) Field of Classification Search
None
See application file for complete search history.

(56) References Cited

U.S. PATENT DOCUMENTS

2018/0050320 A1\*  2/2018 Verschuur ............. B01J 20/12

\* cited by examiner

*Primary Examiner* — Tam M Nguyen
(74) *Attorney, Agent, or Firm* — Osha Bergman Watanabe & Burton LLP

(57) ABSTRACT

A composition and method for the removal of water from a water-containing hydrocarbon stream, and a method for the production of a metal/water-soluble polymer composite are provided. The composite includes a water-soluble polymer, such as guar gum, and a metal salt, such as aluminum nitrate or copper sulfate. The ratio of the metal salt to the water-soluble polymer is in the range from about 1:1 to about 5:1 by mass. The water-soluble polymer and the metal salt form a crosslinked material. The method for producing the metal/water-soluble polymer composite includes mixing a non-crosslinked water-soluble polymer with a metal salt and water to form a paste. The paste is then dried.

10 Claims, 1 Drawing Sheet

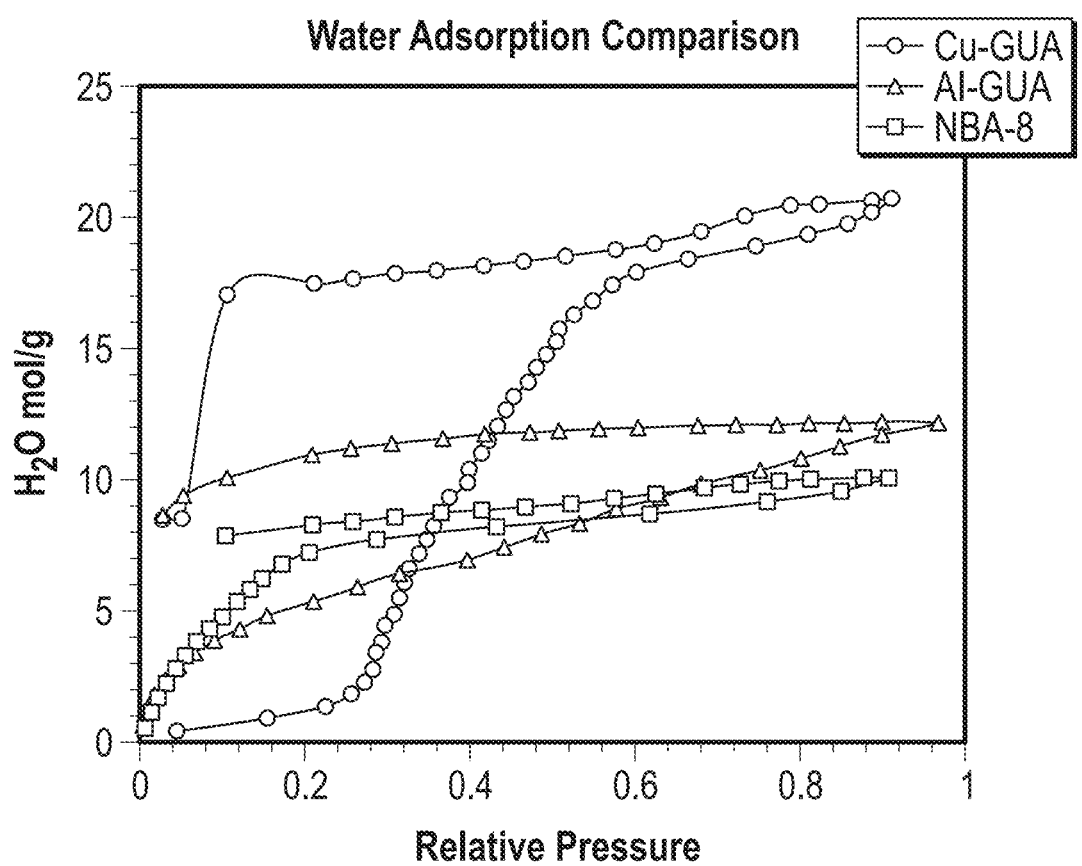

POLYMER-METAL SALT COMPOSITE FOR THE DEHYDRATION OF WATER FROM SWEET GAS AND LIQUID CONDENSATE STREAMS

BACKGROUND

Water removal is particularly important in a number of chemical processes. The removal of water from a natural gas or hydrocarbon condensate stream is one such process. Upon production of oil or gas from a well, water from the reservoir and other sources is often present and needs to be removed. This material needs to be dehydrated to prevent damage to equipment downstream. Dehydration may be performed following the removal of other contaminants, such as hydrogen sulfide. This is often performed with the use of an adsorbent.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to compositions and methods for the removal of water from sweet gas and liquid condensate streams, and a method for the production of metal/water-soluble polymer composites. The composition includes a water-soluble polymer and a metal salt. The ratio of the metal salt to the water-soluble polymer ranges from about 1:1 to about 5:1 by mass. The water-soluble polymer and the metal salt form a crosslinked material. The composition may be used for drying a hydrated hydrocarbon stream by passing the hydrated hydrocarbon stream through one or more temperature swing adsorption vessels containing the composition to produce a dehydrated hydrocarbon stream.

The method to produce the metal/water-soluble polymer composites may include mixing a water-soluble polymer that has not been crosslinked with a metal salt and water to form a paste. The paste is dried.

Other aspects and advantages of the claimed subject matter will be apparent from the following description and the appended claims.

BRIEF DESCRIPTION OF DRAWINGS

The FIGURE is a plot of experimental results for the embodiments of Example 1, Example 2, and Comparative Example 1.

DETAILED DESCRIPTION

Sorbents utilized for the removal of water become saturated and must be regenerated to be reused. This regeneration typically requires elevated temperatures, which requires heating, often using hot regeneration gases. These hot regeneration gases must be heated themselves, which requires additional energy. Reduction of the temperature of these gases reduces the energy requirement for producing them. In addition, an increased water adsorption capacity is useful, in that the time between regeneration cycles can be made longer than with a reduced water adsorption capacity.

In one or more embodiments, lower regeneration temperatures for adsorbents may be achieved through the use of a composite material comprising a water-soluble polymer and a metal-salt. In one or more embodiments, such a composite material may have an increased water adsorption capacity compared with many molecular sieve desiccant adsorbents. The inventors have found that embodiments may be produced via a limited number of steps using materials that are typically comparatively inexpensive when compared with many materials known to those skilled in the art.

Water-soluble polymers are those that are able to be dissolved in water. These polymers, when dissolved in water, increase the viscosity of the resulting solutions. In addition, solutions of water-soluble polymers and water often exhibit non-linear rheology. When not in a composite, the neat water-soluble polymer, upon the addition of water, will dissolve, making it unsuitable for use as a desiccant.

In one or more embodiments, the water-soluble polymer may be able to be crosslinked through the addition of the metal salt. In one or more embodiments, the water-soluble polymer is not crosslinked prior to mixing with the metal salt. This is because, in some cases, a crosslinked polymer may simply swell in water, forming a gel, and may not be capable of forming a paste when combined with a metal salt. In one or more embodiments, the water-soluble polymer may be ground into a powdered form prior to its introduction into the metal salt.

In one or more embodiments, the water-soluble polymer may include, but is not limited to a homopolymer, a copolymer, a blend, or a combination thereof. In one or more embodiments, the water-soluble polymer may include, but is not limited to, one or more of polyvinyl alcohol, polyethylene glycol, Arabic gum, guar gum, or a combination of any of these. In one or more embodiments, the water-soluble polymer may comprise, consist of, or consist essentially of guar gum.

The metal salt comprises a compound that forms a metal hydrate salt upon the addition of water. Typically, metal hydrate salts allow for the absorption of water and comprises a metal, an ion, and water molecules that are bound in a definite ratio. For example, copper sulfate pentahydrate comprises five water molecules that are bound to copper sulfate salt. Metal hydrate salts can be dehydrated, whereby the water is removed, leaving just the metal and the ion. One way in which this may be done is through the application of heat. In one or more embodiments, the metal salts may include, but are not limited to copper sulfate, aluminum nitrate calcium chloride, magnesium sulfate, nickel nitrate, and magnesium chloride. In other embodiments, the metal salt may comprise, consist, or consist essentially of copper sulfate or aluminum nitrate.

The process through which a metal/water-soluble polymer composite may be formed according to embodiments herein involves bringing the water-soluble polymer and the metal salt into contact, forming a paste, and drying. The water-soluble polymer, the metal salt, or both may be in the form of a powder before mixing. Mixing of the metal salt, water-soluble polymer, and water may be performed in any order, such as mixing the metal salt and water-soluble polymer, and then adding water, or mixing the water and metal salt before adding the dissolved salt mixture to the water-soluble polymer, for example. In some embodiments, following formation of the paste, the resulting composition may be formed into pellets, tablets, or other shapes, such as by extrusion, tableting, or other processes as known to those skilled in the art and dried.

In one or more embodiments, the resulting paste, as well as the resulting absorbent composition, may have a ratio of the metal salt to the water-soluble polymer (both on a dry basis) in a range from about 1:1 to about 5:1 by mass. A ratio of the weight of the metal salt to the weight of the water-soluble polymer may have an upper limit of about 5:1, 4:1, 3:1, or about 2.5:1, and a lower limit of from about 1:1, 1.5:1, 1.75:1, or about 1.9:1, where any upper limit may be combined with any lower limit.

As noted above, water may be added in sufficient quantity to form a paste, which may then be dried. In one or more embodiments, the ratio of water to water-soluble polymer in the paste may be in a range from about 3:1 to about 10:1 by mass. The range of the ratio of water to water-soluble polymer may have an upper limit of about 10:1, 7:1, or about 5:1 and a lower limit of about 3:1, 3.3:1, or about 3.5:1, with any upper limit being combinable with any lower limit. Insufficient water may result in insufficient mixing and association of the metal salt with the water-soluble polymer to form a paste. On the other hand, too much water may also result in a mixture of insufficient quality to form a paste that may be readily extruded, shaped, and dried, for example.

In other embodiments, the polymer may be dissolved in the water prior to mixing with the metal salt. In yet other embodiments, the polymer and the metal salt may also be ground together into a powder prior to mixing with water. The polymer and the metal salt may both be in powder form before being mixed together with the water in any order. In one or more embodiments, one or more of the components may be mixed using any method apparent to those skilled in the art, such as, for example, in a kneader or a continuous mixer. The resulting mixture may be homogeneous prior to further processing. The paste may then be formed into conglomerations through any method apparent to those skilled in the art, such as through extrusion or tableting.

Drying of the paste or the extrudate may be performed in air at ambient conditions, under vacuum, at elevated temperatures, or a combination of these. For example, in some embodiments, the paste or extrudate may be dried at ambient conditions using air. In other embodiments, the past or extrudate may be dried under vacuum at an elevated temperature. In yet other embodiments, the past or extrudate may be partially dried with ambient air followed by drying under vacuum at an elevated temperature.

The paste or extrudate may be exposed to air to dry for at least 24 hours (h) in some embodiments. In other embodiments, the paste may be exposed to air to dry for 24 h to 120 h. The paste may be exposed to air to dry for 48 to 96 hours in yet other embodiments. Drying may also occur at an elevated temperature in air, nitrogen, or under vacuum for a shorter time, such as at a temperature of 110° C. (230° F.) in air or at 60° C. (140° F.) under vacuum for 8 h to 96 h, such as about 16 hours.

In one or more embodiments, the paste or extrudate, or the partially dried paste or extrudate resulting from air drying, may be dried under vacuum and/or at elevated temperatures. In one or more embodiments, the paste may be allowed to dry in vacuum for at least 12 hours after the previous air drying. After air drying, the paste may be allowed to dry in a vacuum from about 18 hours to about 48 hours in other embodiments. In one or more embodiments, the vacuum may be at a pressure (absolute pressure) in a range from a maximum value of about 0.2 bar or about 0.1 bar, to a minimum value of about 0.001 bar or about 0.01 bar, with either maximum being able to be combined with either minimum. In one or more embodiments, drying under vacuum may take place at a temperature from about 50° C. to about 110° C. In other embodiments, drying under vacuum may take place at a temperature in the range from about 60° C. to about 100° C. In still other embodiments, drying under vacuum may take place at a temperature in the range from about 65° C. to about 85° C.

In one or more embodiments, the resulting material is crosslinked. Crosslinking may occur between the oxygen atoms in the guar gum and the metal ions, the metal acting as a bridge. The composite may be homogenous. The composite may have any desired geometry, which may include, but is not limited to, rods, spheres, granules, pellets, or combinations thereof. The resulting product may have a water adsorption capacity ranging from 10 mol/g to 30 mol/g.

In one or more embodiments, the composite may be utilized for the removal of water from a water-containing hydrocarbon stream, such as a sweet gas or condensate. In one or more embodiments, this may be done through temperature swing adsorption. In temperature swing adsorption, typically two or more temperature swing adsorption vessels have an adsorbent inside, where at least one vessel is in adsorption mode, and one or more vessels are in a regeneration mode. The vessels are filled with the composite, which acts as an adsorbent, according to one or more embodiments. A hydrated hydrocarbon stream is sent through one or more temperature swing adsorption vessels, producing a dehydrated hydrocarbon stream. At any given time, at least one of the vessels is being used for the removal of a component, in this case water, from a gas or liquid stream. Because the composite becomes saturated over time, at least one other vessel is being regenerated at any given time. That is, hot regeneration gas is sent through one or more of the regenerating temperature swing adsorption vessels to remove the component, in this case water, from the composite. This allows for continuous operation by switching between vessels.

The hot gas used in temperature swing adsorption requires heating, so any reduction in required temperature for regeneration enables a reduction in energy consumed in heating the gas. Regeneration of the metal salt/water-soluble polymer composites according to embodiments herein may be performed, for example, using air or nitrogen as a sweep gas. The regeneration may also be performed at relatively low temperatures, similar to those used for drying the paste, such as in a range from about 100° C. to 130° C. In comparison, drying of molecular sieves typically requires temperatures in excess of 250° C. Here, sweet gas may be defined as natural gas that does not contain significant quantities of $H_2S$. Specifically, sweet gas does not contain more than 10 ppmv $H_2S$. Condensate is defined as liquid hydrocarbons, such as those that may be condensed from a natural gas during processing of a hydrocarbon from a wellbore (ethane, propane, butane, for example). In some embodiments, condensate may have the same $H_2S$ specifications as the sweet gas prior to being sent to the dehydrator.

Example 1

Preparation of Composite Materials 1 g of guar gum and 3.5 g of copper (II) sulfate pentahydrate were mixed in a mortar and pestle until a homogeneous mixture was produced. Water was added dropwise until a homogeneous paste was produced. The material was transferred to a needleless syringe, from which extrudates were produced. The extrudates were dried in air for three days prior to drying under vacuum at 70° C. for 24 hours. The extrudates were then cut down to length.

Example 2

3.5 g of aluminum nitrate nonahydrate was dissolved in water. 1 g of guar gum was added and mixed until a homogeneous paste was acquired. The material was transferred to a needleless syringe, from which extrudates were produced. The extrudates were dried in air for three days prior to drying under vacuum at 70° C. for 24 hours. The extrudates were then cut down to length.

Comparative Example 1

NBA-8 molecular sieve was used as a comparative example. NBA-8 is a molecular sieve, Type 4A, ⅛ in (2.5-5 mm), comprising a crystalline alumino-silicate with a uniform, three-dimensional structure consisting of alumina and silica tetrahedra with a regeneration temperature of 550° F.
Experimental Testing Testing of the example composition and the comparative molecular sieve was performed using a 3FLEX Autosorb produced by Micromeritics® at about 20° C. and about 1 bar.

Results are displayed in the Figure.

The aluminum nitrate nonahydrate/guar gum composite shown in Example 2, and the copper sulfate pentahydrate/guar gum composite shown in Example 1 showed improved water uptake upon exposure to high humidity gas when compared to NBA-8 from Comparative Example 1. Both the copper sulfate/guar gum composite and the aluminum nitrate/guar gum composite had an increased adsorption capacity when compared to NBA-8, with copper sulfate/guar gum showing a greater improvement in adsorption. When used for dehydration, an increase in adsorption capacity via one or more embodiments may enable the use of less adsorbent, smaller vessels, lower pressure drops, or all three when compared to NBA-8. Further, the regeneration gas temperature of these materials is lower, such as 230° F., versus 550° F. with the NBA-8 molecular sieve. This allows for a reduced heat duty to the dehydrators, and a reduced OPEX.

It was also found that the inventive examples using guar gum provided stable, regenerable composites. In other words, they may be used as absorbents and regenerated through multiple cycles without issue.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method for the production of a metal/water-soluble polymer composite consisting essentially of:
    mixing a non-crosslinked water-soluble polymer with a metal salt and water to form a paste; and
    drying the paste.
2. The method of claim 1, further comprising extruding the paste.
3. The method of claim 1, further comprising crosslinking the metal and the non-crosslinked water-soluble polymer to form a metal/water-soluble polymer composite.
4. The method of claim 1, wherein the metal salt is dissolved in the water prior to the mixing.
5. The method of claim 1, wherein the metal salt and the water-soluble polymer are mixed prior to the addition of the water.
6. The method of claim 1, wherein the drying comprises putting the paste under vacuum at a temperature from 50° C. to 110° C.
7. The method of claim 6, wherein the paste is under vacuum for at least 12 hours.
8. The method of claim 1, wherein the drying comprises exposing the paste to air for at least 24 hours.
9. The method of claim 1, wherein the water-soluble polymer comprises guar gum.
10. The method of claim 1, wherein the metal salt is selected from the group consisting of aluminum nitrate and copper sulfate.

* * * * *